United States Patent
Pham et al.

(10) Patent No.: US 7,297,169 B2
(45) Date of Patent: Nov. 20, 2007

(54) APPARATUS AND METHOD FOR HYDROCARBON REFORMING PROCESS

(75) Inventors: Hoanh Nang Pham, Allentown, PA (US); David Hon Sing Ying, Macungie, PA (US); Shoou-I Wang, Allentown, PA (US); Scott David Madara, Easton, PA (US); Joel Charles MacMurray, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 754 days.

(21) Appl. No.: 10/746,577

(22) Filed: Dec. 24, 2003

(65) Prior Publication Data

US 2004/0134127 A1    Jul. 15, 2004

Related U.S. Application Data

(62) Division of application No. 09/666,420, filed on Sep. 20, 2000, now abandoned.

(51) Int. Cl.
*C01B 3/32* (2006.01)

(52) U.S. Cl. .............................. 48/198.7; 48/61; 48/94; 48/198.1; 48/127.9; 423/650; 423/651; 423/652; 423/653; 423/654

(58) Field of Classification Search ................ 48/61, 48/94, 198.1, 198.7, 127.9; 423/650–654; 422/188–191, 193–198, 202, 204, 211
See application file for complete search history.

(56) References Cited

U.S. PATENT DOCUMENTS 4,440,727 A    4/1984    Bruck
4,792,436 A    12/1988   Tsai
4,830,834 A    5/1989    Stahl et al.
5,181,990 A    1/1993    Arisaki et al.
5,199,961 A    4/1993    Ohsaki et al.
5,226,928 A    7/1993    Makabe et al.
5,945,074 A    8/1999    Waterreus et al.
6,136,279 A    10/2000   Stahl

FOREIGN PATENT DOCUMENTS

EP    0911076    4/1999

*Primary Examiner*—Basia Ridley
(74) *Attorney, Agent, or Firm*—Bryan C. Hoke, Jr.

(57) ABSTRACT

The present invention is an apparatus arranged to maximize heat utilization for a hydrocarbon steam reforming process to produce synthesis gas. The apparatus comprises a refractory lined vessel with partition walls that divide the inside of the vessel into (1) a combustion chamber(s) containing one or more burners, and (2) convection chambers used as a means to remove combustion products from the combustion chamber through one or more openings at the opposite end of the burner end. The combustion chamber contains one or more reformer tubes in which a mixed-feed of hydrocarbon and steam flow co-current with combustion products and receive direct radiant heat from the combustion flame through the tube wall. The convection chambers contain a tube-in-tube device filled with catalyst in the annuli. The mixed-feed in the annuli flows counter-current with combustion products and the hot product synthesis gas, and thereby substantially lowers the temperature of the combustion and product gases before the gases exit the furnace. High emissivity materials or walls are used inside the convection chambers to enhance the heat transfer from the flue gas to the reformer tubes.

4 Claims, 14 Drawing Sheets

APPARATUS AND METHOD FOR HYDROCARBON REFORMING PROCESS

CROSS-REFERENCE TO RELATED APPLICATIONS

This application is a divisional of U.S. patent application Ser. No. 09/666,420, filed Sep. 20, 2000, now abandoned, the specification and claims which are incorporated by reference and made a part of this application.

STATEMENT REGARDING FEDERALLY SPONSORED RESEARCH OR DEVELOPMENT

Not applicable.

BACKGROUND OF THE INVENTION

This invention relates to processes for the production of a gas containing hydrogen and carbon oxides (such as methanol synthesis gas) by steam reforming a hydrocarbon feedstock, and in particular to an apparatus and method for hydrocarbon reforming processes which utilize high grade sensible heat of flue gas and product synthesis gas to generate additional product gas and minimize steam export.

The steam reforming process is a well known chemical process for hydrocarbon reforming. A hydrocarbon and steam mixture (a "mixed-feed") reacts in the presence of a catalyst to form hydrogen, carbon monoxide and carbon dioxide. Since the reforming reaction is strongly endothermic, heat must be supplied to the reactant mixture, such as by heating the tubes in a furnace or reformer. The amount of reforming achieved depends on the temperature of the gas leaving the catalyst; exit temperatures in the range 700°-900° C. are typical for conventional hydrocarbon reforming.

Conventional catalyst steam reformer processes combust fuel to provide the energy required for the reforming reaction. In a reformer of such a conventional process, fuel typically is fired co-current to incoming cold feed gas to maximize heat flux through the tube wall(s) by radiant heat transfer directly from the flame. Downstream from the burner end, both the product gas and the flue gas exit at relatively high temperatures. The energy content of these gases usually is recovered by preheating reformer feed gas or by generating steam. As a result, the process generates excess steam that must be exported to improve the overall efficiency of the steam reforming process and to make the process economically feasible in view of the fact that significant equipment has been added to generate that excess steam.

Each of the processes disclosed in U.S. Pat. No. 5,199,961 (Ohsaki, et al.) and U.S. Pat. No. 4,830,834 (Stahl, et al.) and in European Pat. No. EP 0 911 076 A1 (Stahl) utilize a portion of the available sensible energy within the reformer vessel, thereby allowing the product gas and the flue gas to exit at lower temperatures than the corresponding exit temperatures for conventional steam reforming. These reforming processes receive heat from the combustible fuel by using a combination of: (1) an equalizing wall (made of tiles, refractory, or metals) to receive radiant heat directly from the flame from which heat is transferred to the reformer tube(s) by radiant heat; and (2) an arrangement of a counter-current flow of the hot flue gas with the incoming feed which transfers sensible energy to the incoming feed by convection through the tube wall. These techniques allow the temperature of the reformer tube skin to be controlled within the design limit; otherwise, the temperature will be excessive due to the high intensive radiant heat of the flame. However, these processes suffer a heat flux limitation by avoiding the direct radiant heat from the flame to the tube as commonly used in conventional reformers.

U.S. Pat. No. 5,945,074 (Waterreus, et al.) discloses tunnels to remove combustion product gases from a combustion chamber. The tunnels serve to balance or maintain uniform flow of the combustion gases through a furnace but do not utilize the high temperature sensible heat of the combustion gas.

To recover the sensible heat of product gas, prior art hydrocarbon reforming processes use a tube within a tube (tube-in-tube) arrangement with catalyst in the annuli. The cold feed in the annuli flows counter-current with the combustion or the flue gas from the outside and absorbs the combustion heat of both the radiant and convection heat transfers through the outside tube wall. The reformed gas flow is reversed at the end of the catalyst bed and enters the inner-most passage of the tube. The reformed gas then gives up heat to the counter-current flow of the incoming cold feed. The convection heat transfer process from the hot product gas to the reforming reactions is not effective however, because there is no temperature driving force at the inversion point. As a result, more heat transfer surface area is required to utilize the product gas sensible heat. Consequently, the lack of intensive radiant heat transfer from the outside and the ineffective convection heat transfer in the inside result in a large tube-in-tube requirement.

It is desired to have an apparatus and a method for hydrocarbon reforming processes which overcome the difficulties, problems, limitations, disadvantages and deficiencies of the prior art to provide better and more advantageous results.

It is further desired to have an apparatus and a method for a hydrocarbon reforming process which utilize high grade sensible heat of flue gas and product synthesis gas to generate additional product gas and minimize steam export.

It is still further desired to have a more efficient and economic process and apparatus for hydrocarbon reforming.

BRIEF SUMMARY OF THE INVENTION

The invention is an apparatus and method for a hydrocarbon reforming process. A first embodiment of the apparatus includes a vessel having at least one partition wall disposed in the vessel. The at least one partition wall divides the vessel into a plurality of chambers, including at least one combustion chamber and at least one convection chamber. Each of the chambers has a first end and a second end opposite the first end. At least one burner is disposed in the combustion chamber. The burner is adapted to combust a fuel, thereby generating a flue gas having sensible heat. The apparatus also includes communication means between the combustion chamber and the convection chamber whereby at least a portion of the flue gas flows from the combustion chamber to the convection chamber at a first location adjacent the first end of the convection chamber. The apparatus also includes transfer means whereby at least a portion of the flue gas flows to a second location in the convection chamber adjacent the second end of the convection chamber. The apparatus also includes multiple reaction chambers, including a first reaction chamber and a second reaction chamber. A substantial portion of the first reaction chamber is disposed in the combustion chamber, and a substantial portion of the second reaction chamber is disposed in the convection chamber.

In a preferred embodiment, the reaction chambers, which preferably are tubular devices, are reformer tubes. The tubular devices may be reformer radiant tubes or tube-in-tube devices.

There are many variations of the first embodiment. In one variation, a first portion of a mixed-feed flows through the first reaction chamber co-currently with a flow of the flue gas in the combustion chamber, and a second portion of the mixed-feed flows through the second reaction chamber counter-currently with the flow of the flue gas in the convection chamber.

In another variation, a substantial portion of the first reaction chamber is substantially vertical within the combustion chamber. In yet another variation, a substantial portion of a second reaction chamber is substantially vertical within the convection chamber.

In another variation of the first embodiment, the second reaction chamber is a tube-in-tube. In a variation of that variation, a first portion of a mixed-feed flows through the first reaction chamber co-currently with a flow of the flue gas in the combustion chamber, and a second portion of the mixed-feed flows through the second reaction chamber counter-currently with the flow of the flue gas in the convection chamber. In a variation of that variation, the first portion of the mixed-feed flows in an annular portion of the tube-in-tube, and a product synthesis gas flows in an inner tubular portion of the tube-in-tube counter-currently with the first portion of the mixed-feed.

In another variation of the first embodiment, the first reaction chamber is a tube-in-tube. In a variation of that variation, a first portion of a mixed-feed flows through the first reaction chamber co-currently with a flow of the flue gas in the combustion chamber, and a second portion of the mixed-feed flows through the second reaction chamber counter-currently with the flow of the flue gas in the convection chamber. In a variation of that variation, the first portion of the mixed-feed flows in an annular portion of the tube-in-tube, and a product synthesis gas flows in an inner tubular portion of the tube-in-tube counter-currently with the first portion of the mixed-feed.

Another embodiment of the invention is similar to the first embodiment but includes communication means between the first reaction chamber and the second reaction chamber, whereby a fluid flows from or to said first reaction chamber to or from said second reaction chamber.

In yet another embodiment of the invention, the apparatus includes at least one combustion chamber and at least one convection chamber, each of the chambers having a first end and a second end opposite the first end. At least one burner is disposed in the combustion chamber. The burner is adapted to combust a fuel, thereby generating a flue gas having sensible heat. The apparatus also includes communication means between the combustion chamber and the convection chamber whereby at least a portion of the flue gas flows from the combustion chamber to the convection chamber at a first location adjacent the first end of the convection chamber. The apparatus also includes transfer means whereby at least a portion of the flue gas flows to a second location in the convection chamber adjacent the second end of the convection chamber. The apparatus also includes multiple reaction chambers, including a first reaction chamber and a second reaction chamber. A substantial portion of the first reaction chamber is disposed in the combustion chamber, and a substantial portion of the second reaction chamber is disposed in the convection chamber.

In a preferred embodiment of this embodiment, the reaction chambers, which preferably are tubular devices, are reformer tubes. The tubular devices may be reformer radiant tubes or tube-in-tube devices.

Another aspect of the invention is an assembly of multiple units for a hydrocarbon reforming process, each unit comprising an apparatus as in the first embodiment (or another of the embodiments). Many embodiments of this aspect are discussed below and illustrated in the drawings. For example, in one embodiment, the assembly also includes at least one duct connecting a first convection chamber and a second convection chamber of the at least one convection chamber in at least one unit. Another embodiment includes those same features but also includes at least one convection pass in communication with the at least one duct.

Yet another aspect of the invention is a method for producing a product from a steam reforming process. A first embodiment of the method includes multiple steps. The first step is to provide at least one combustion chamber, at least one convection chamber, and a communication means between the combustion chamber and the convection chamber, each of the chambers having a first end and a second end opposite the first end, the communication means being adapted to transmit a flow of flue gas from the combustion chamber to the convection chamber. The second step is to combust a fuel in the combustion chamber, thereby generating a combustion heat and a flue gas having a sensible heat. The third step is to transfer at least a portion of the flue gas from the combustion chamber to the convection chamber, wherein at least a portion of the transferred flue gas flows from a first location adjacent the first end of the convection chamber to a second location adjacent the second end of the convection chamber. The fourth step is to feed a first portion of a mixed-feed to a first reaction chamber, a substantial portion of the first reaction chamber being disposed in the combustion chamber, wherein the first portion of the mixed-feed absorbs at least a portion of the combustion heat. The fifth step is to feed a second portion of the mixed-feed to a second reaction chamber, a substantial portion of the second reaction chamber being disposed in the convection chamber, wherein the second portion of the mixed-feed absorbs at least a portion of the sensible heat of the flue gas flowing from the first location to the second location in the convection chamber.

There are many variations of the first embodiment of the method. In one variation, the first portion of the mixed-feed flows co-currently with a flow of flue gas in the combustion chamber. In another variation, the mixed-feed flows counter-currently with the flue gas flowing from the first location to the second location in the convection chamber.

Another embodiment of the method is similar to the first embodiment of the method but includes an additional step. The additional step is to withdraw a stream of the product from the first reaction chamber. In a variation of this embodiment, the stream of the product flows counter-currently with the first portion of the mixed-feed.

Yet another embodiment of the method is similar to the first embodiment of the method but includes an additional step. The additional step is to withdraw a stream of the product from the second reaction chamber. In a variation of this embodiment, the stream of the product flows counter-currently with the second portion of the mixed-feed.

Still yet another embodiment of the method is similar to the first embodiment of the method, but includes an additional step. The additional step is to provide communication means between the first reaction chamber and the second reaction chamber whereby a stream of the product flows from or to the first reaction chamber to or from the second reaction chamber.

In all of the embodiments of the method, the reaction chambers preferably are tubular devices, such as reformer tubes. The tubular devices may be reformer radiant tubes or tube-in-tube devices.

BRIEF DESCRIPTION OF SEVERAL VIEWS OF THE DRAWINGS

Embodiments of the invention will now be described by way of example with reference to the accompanying drawings, in which.

DETAILED DESCRIPTION OF THE INVENTION

The present invention uses partition walls 14 to separate the furnace or reformer into two different types of chambers: (1) a combustion chamber 16, and (2) convection chambers 18, as shown in FIGS. 1 and 2.

The combustion chamber 16 contains one or more burners 24 and conventional radiant tubes and/or a conventional tube-in-tube arrangement exposed directly to the burner flame, similar to that in conventional reformers. However, the co-current flow of the process and combustion product gases of the present invention provides maximum heat flux to the reformer tubes without the limitations observed in the prior art.

The convection chambers 18 do not contain a burner but receive the hot combustion products from the combustion chamber 16. The convection chambers also contain conventional reformer tubes and/or a tube-in-tube arrangement to recover the sensible heat from both the flue gas from the outside and the hot product gas from the inside. The counter-current flow of the mixed-feed (steam plus hydrocarbon feed) and the hot combustion gas in the convection chambers allows the combustion gas to leave the reformer at a substantially lower temperature as compared to a conventional reformer. Hence, no shock coil is required and a much smaller convective pass is needed to recover the remaining flue gas sensible heat. In addition, the convection chambers serve as a means to provide uniform flow of combustion gas in the combustion chamber. Also, the counter-current flow of the mixed-feed and the synthesis product gas allows the synthesis gas to leave the reformer at a relatively low temperature that permits use of a simple kettle boiler rather than a complex process gas waste heat boiler as in conventional steam reforming processes.

Figure 1:
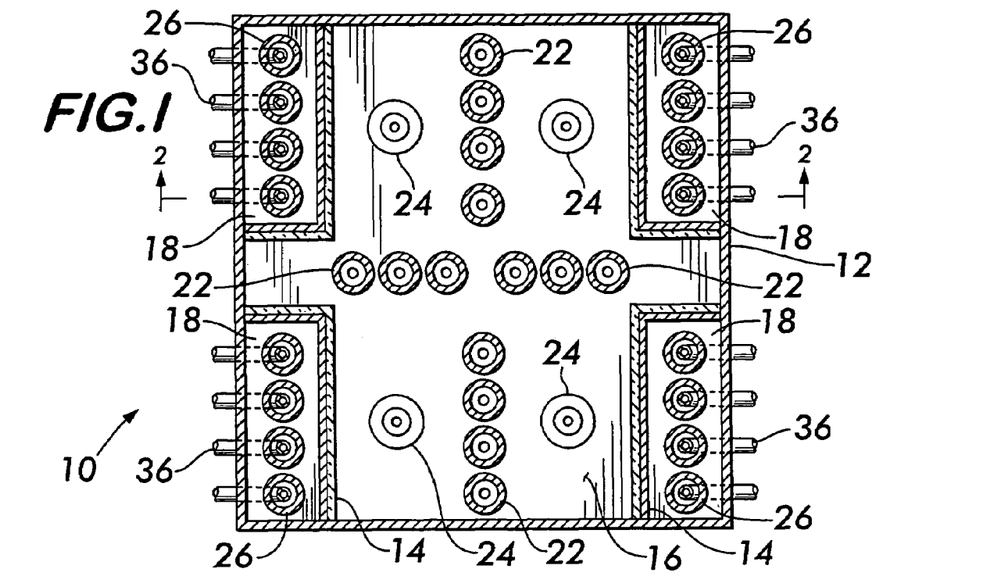
FIG. 1 is a schematic cross-sectional plan view of the apparatus for one embodiment of the invention.
Figure 2:
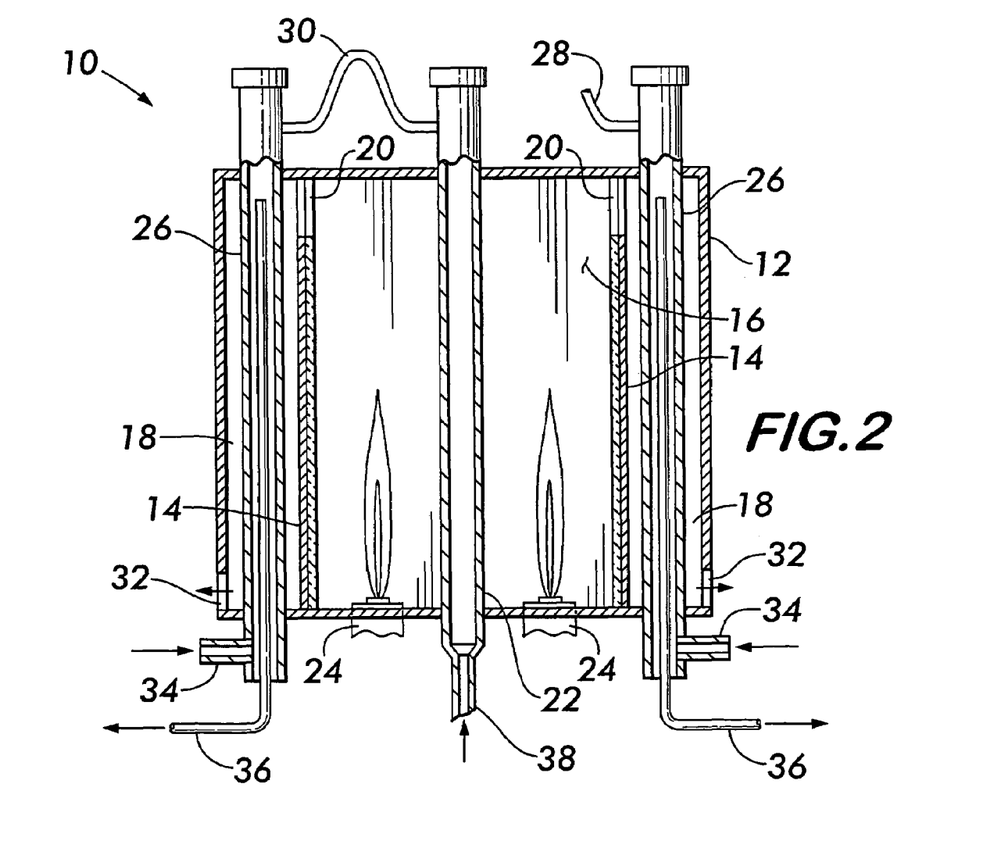
FIG. 2 is a schematic partial cross-sectional elevation of the embodiment of the invention shown in FIG. 1.

Referring to FIGS. 1 and 2, the apparatus 10 of the present invention includes a refractory lined vessel 12. The vessel contains partition walls 14 that divide the inside of the vessel into a combustion chamber 16 (or radiant section) containing burner(s) 24 and one or more smaller convection chambers 18 (or convection sections) used as a means to remove combustion products from the combustion chamber. At the far end opposite the burner end of the vessel, the partition walls have one or more openings 20 that allow the combustion products from the combustion chamber to enter the smaller convection chambers and return to the burner end before exiting the vessel. In the convection chambers, baffles (not shown) can be used to enhance convective heat transfer. The convection chambers are designed to maintain high flue gas velocity and to thereby maintain high convection heat transfer before the flue gas exits the vessel. Each partition wall can be made from a sheet of high emissivity metal insulated on the combustion side, or can be a refractory wall made of a composite of conventional refractory materials, such as high temperature fired bricks. In the latter case, the convection side of the refractory wall is coated with a high emissivity material.

Conventional reformer radiant tubes 22 or conventional tube-in-tube devices with catalyst in their annuli are used in the combustion chamber 16 to utilize high intensive radiant heat directly from the flame of the burner(s) 24. Conventional reformer catalyst tubes 26—tube-in-tube devices with catalyst in their annuli, or tube-in-tube devices that connect with the radiant tubes from the combustion chamber to receive the hot product gas from the radiant tubes—are placed in the convection chambers 18 to recover the sensible heat from the flue gas and the product gas from the reforming reaction.

Figure 3:
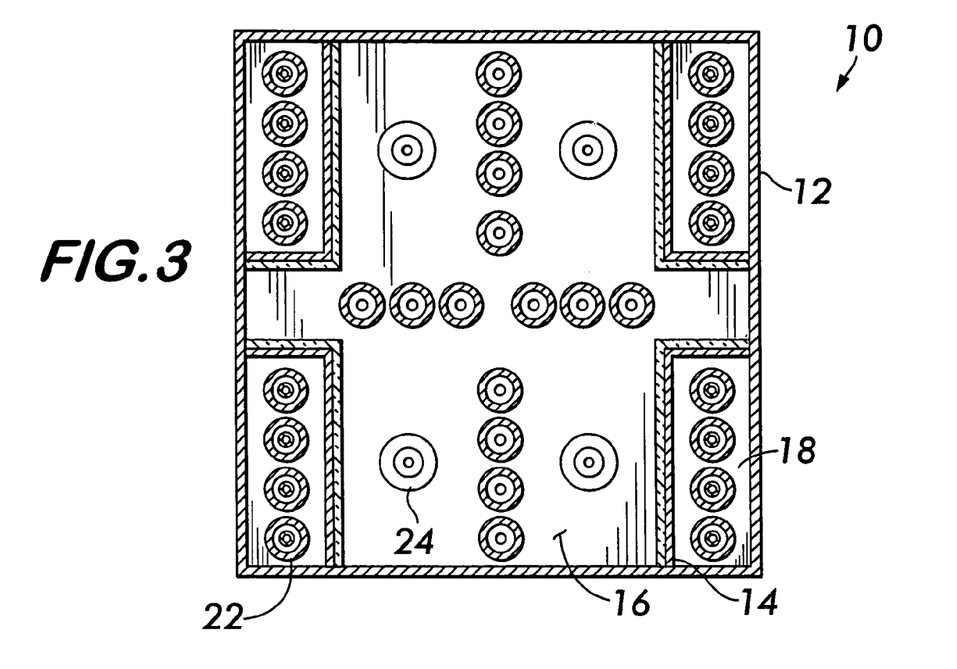
FIGS. 3, 4 and 5 are schematic cross-sectional plan views of the vessel of the present invention having different shapes—square, circular and hexagonal.
Figure 4:
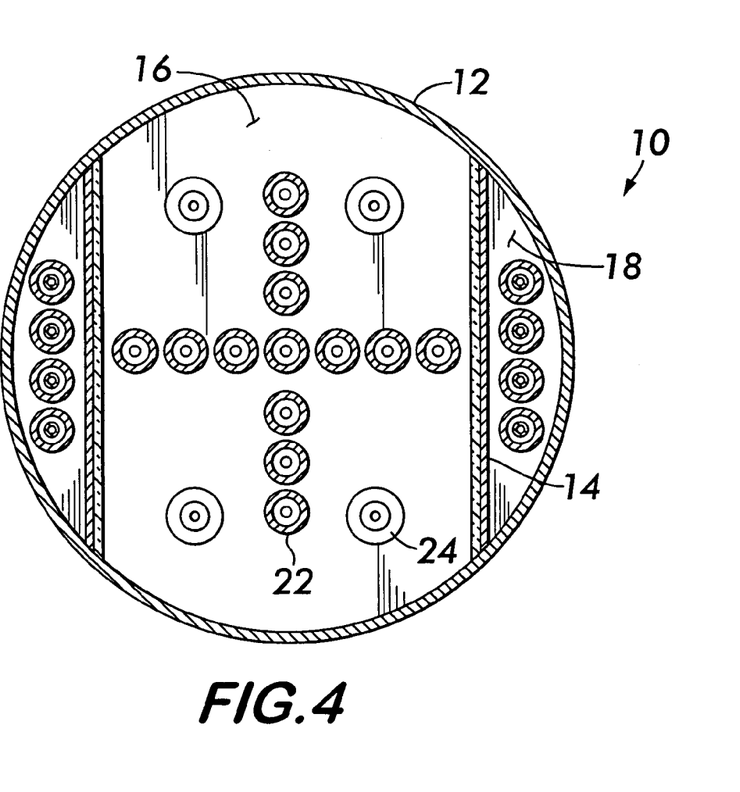
Figure 5:
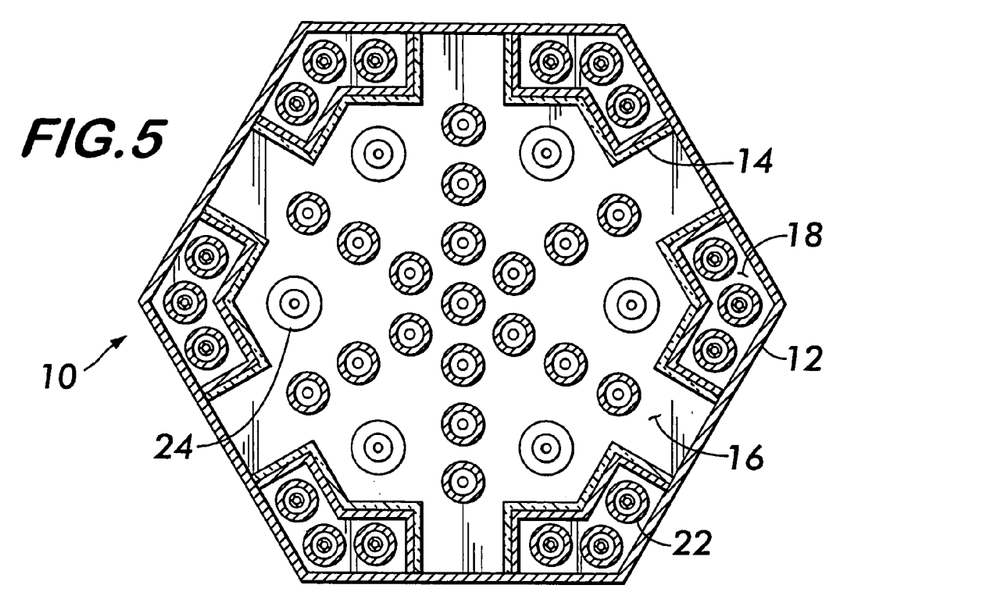

FIGS. 3, 4 and 5 show several different shapes of the vessel 12 that may be used for the present invention. Feasible shapes include but are not limited to cylindrical, triangular, square, rectangular, and hexagonal. Any shape may be used that allows for partition walls 14 between at least one combustion chamber 16 (having at least one burner 24) and at least one convection chamber 18 (having means 32 for a flue gas exit).

FIG. 2 shows one configuration having a conventional radiant tube 22 in the combustion chamber 16 and tube-in-tube devices 26 in the convection chambers 18. At the end opposite the burner end, the radiant tube and the tube-in-tube devices are connected to a common manifold (not shown) by pigtails 28 or by individual pigtails 30 that directly transfer the hot synthesis gas from the radiant tube to the tube-in-tube devices. In this arrangement, mixed-feed enters the radiant tube at the inlet 38 and the tube-in-tube devices at inlets 34. Flue gas exits the convection chambers at flue gas exits 32, and product synthesis gas exits the tube-in-tube devices at syngas outlets 36. The mixed-feed in the radiant tube flows co-current with the combustion products in the combustion chamber. The mixed-feed in the annuli of the tube-in-tube devices flows counter-current to the hot flue gas in the convection chambers. The sensible heat of the flue gas and the sensible heat of the product gas are utilized to generate more product synthesis gas. The temperatures of the exit flue gas and the product gas can be varied to generate additional steam if needed.

Figure 6:
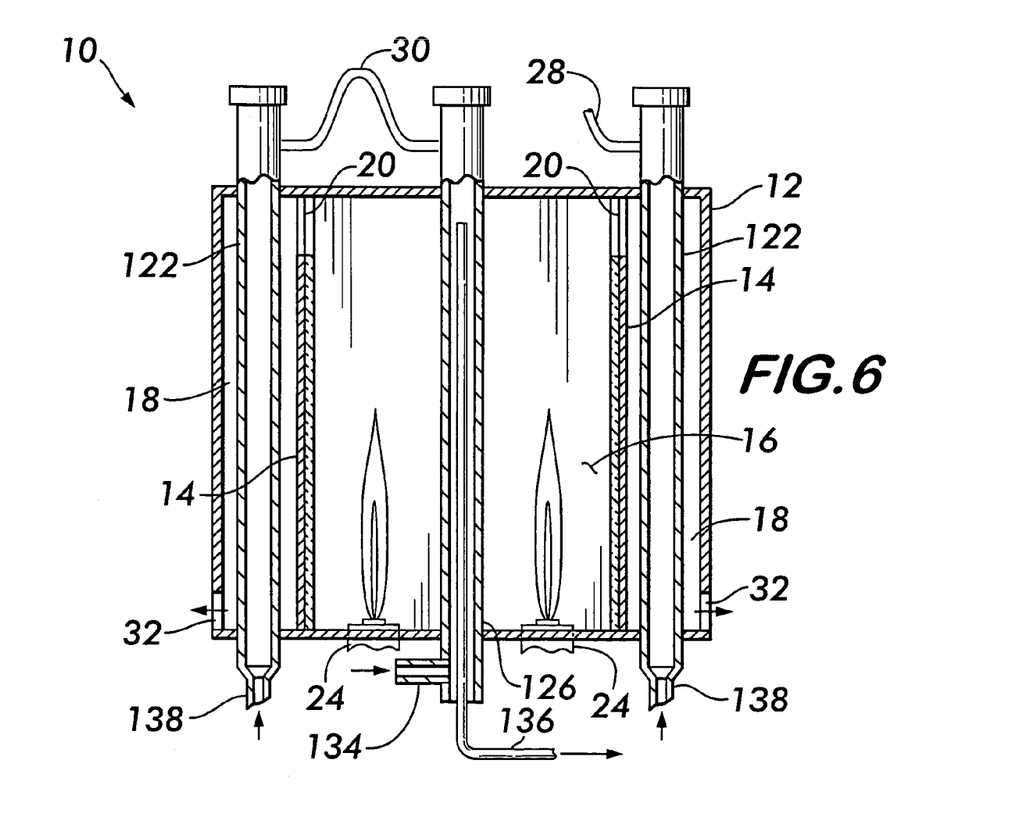
FIG. 6 is a schematic partial cross-sectional elevation of another embodiment of the invention.

FIG. 6 shows another configuration of the apparatus 10 of the present invention arranged differently than the configuration in FIG. 2. In FIG. 6, conventional radiant tubes 122 are placed in the convection chambers 18 and a tube-in-tube device 126 with catalyst in the annuli is located in the combustion chamber 16. Mixed-feed enters the radiant tubes at inlets 138 and the tube-in-tube device at inlet 134. The hot synthesis gas is flowed from the radiant tubes in the convection chambers to the tube-in-tube device in the combustion chamber. Product synthesis gas exits the tube-in-tube device at syngas outlet 136.

Figure 8:
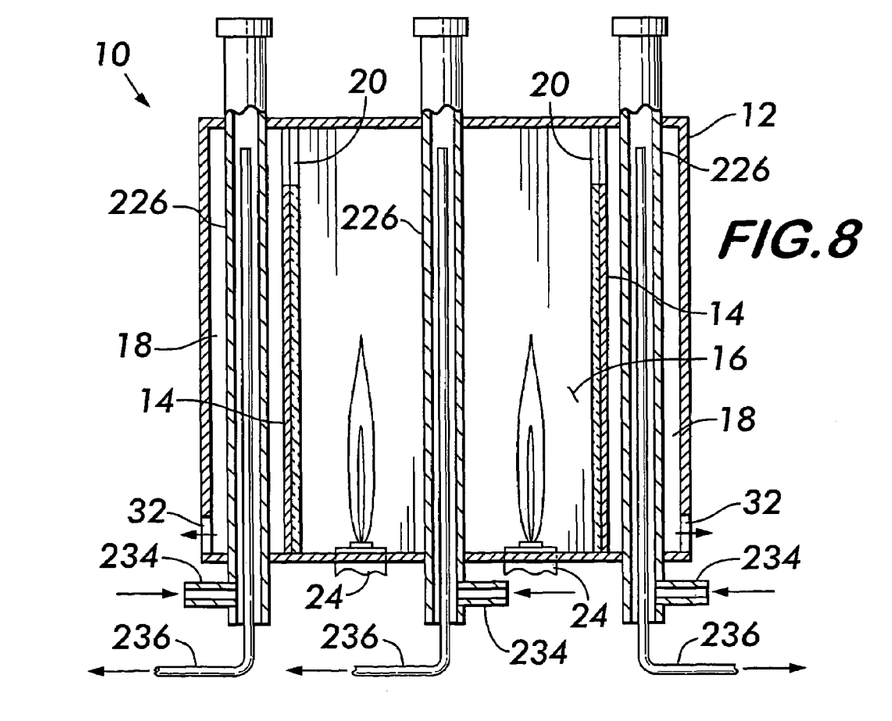
FIG. 8 is a schematic partial cross-sectional elevation of another embodiment of the invention.

FIG. 8 shows another configuration of the apparatus 10 in which tube-in-tube devices 226 with catalyst in the annuli are used in both the combustion chamber 16 and the convection chambers 18. Mixed-feed enters the tube-in-tube devices at inlets 234, and product synthesis gas exits at syngas outlets 236. This configuration utilizes high grade heat of the product gas in its own tube, minimizes hot gas transfer lines, makes it easy to add additional capacity, and makes it easy to vary steam export if necessary.

Figure 7:
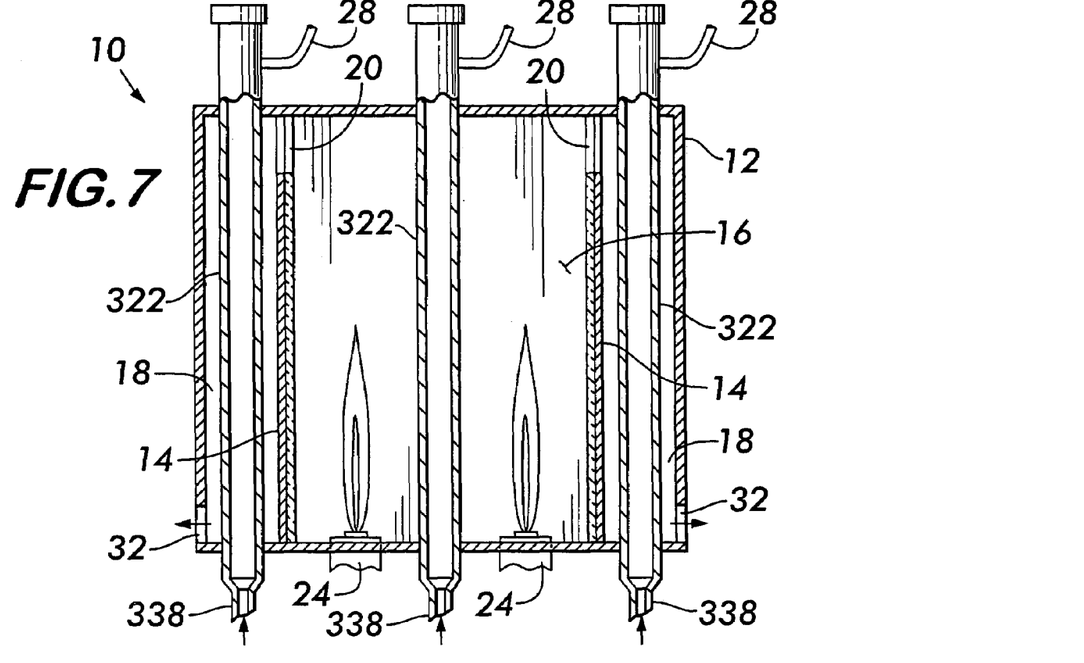
FIG. 7 is a schematic partial cross-sectional elevation of another embodiment of the invention.

FIG. 7 shows another configuration of the apparatus 10 in which conventional radiant tubes 322 are used in both the combustion chamber 16 and the convection chambers 18. In this arrangement, only the high grade sensible heat of the flue gas is utilized to generate more products. Mixed-feed enters the radiant tubes at inlets 338, and product synthesis gas exits via pigtails 28. The sensible heat of the product gas can be used to generate extra steam if needed or additional product externally in a separate conventional device such as shown in U.S. Pat. No. 5,122,299 (Le Blanc) and U.S. Pat. No. 5,006,131 (Karafian, et al.).

All burner arrangements in the combustion chambers shown in FIGS. 2, 6 and 8 can be repositioned to achieve down-firing. The process gas (or mixed-feed) flow can be arranged appropriately to maximize heat absorbed from the combustion of fuel. Persons skilled in the art will recognize that the burners also may be located other than shown in the drawings, such as at any point on the side walls of the combustion chamber.

Figure 9:
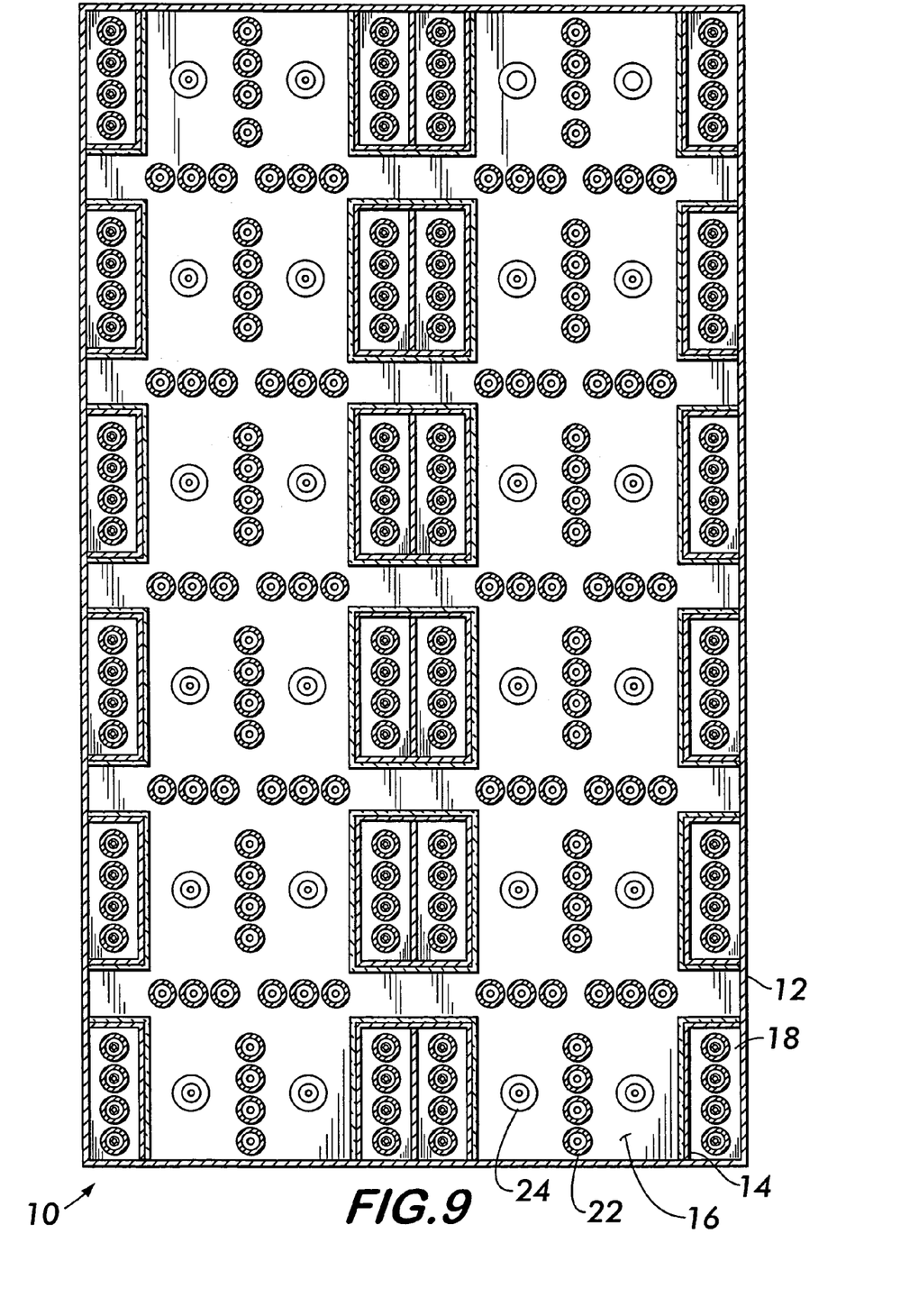
FIG. 9 is a schematic cross-sectional plan view of a modular arrangement of multiple square units of the apparatus of the present invention.

FIG. 9 shows an arrangement of a reformer that combines several square modular units of the apparatus 10 to increase syngas production capacity.

Figure 10:
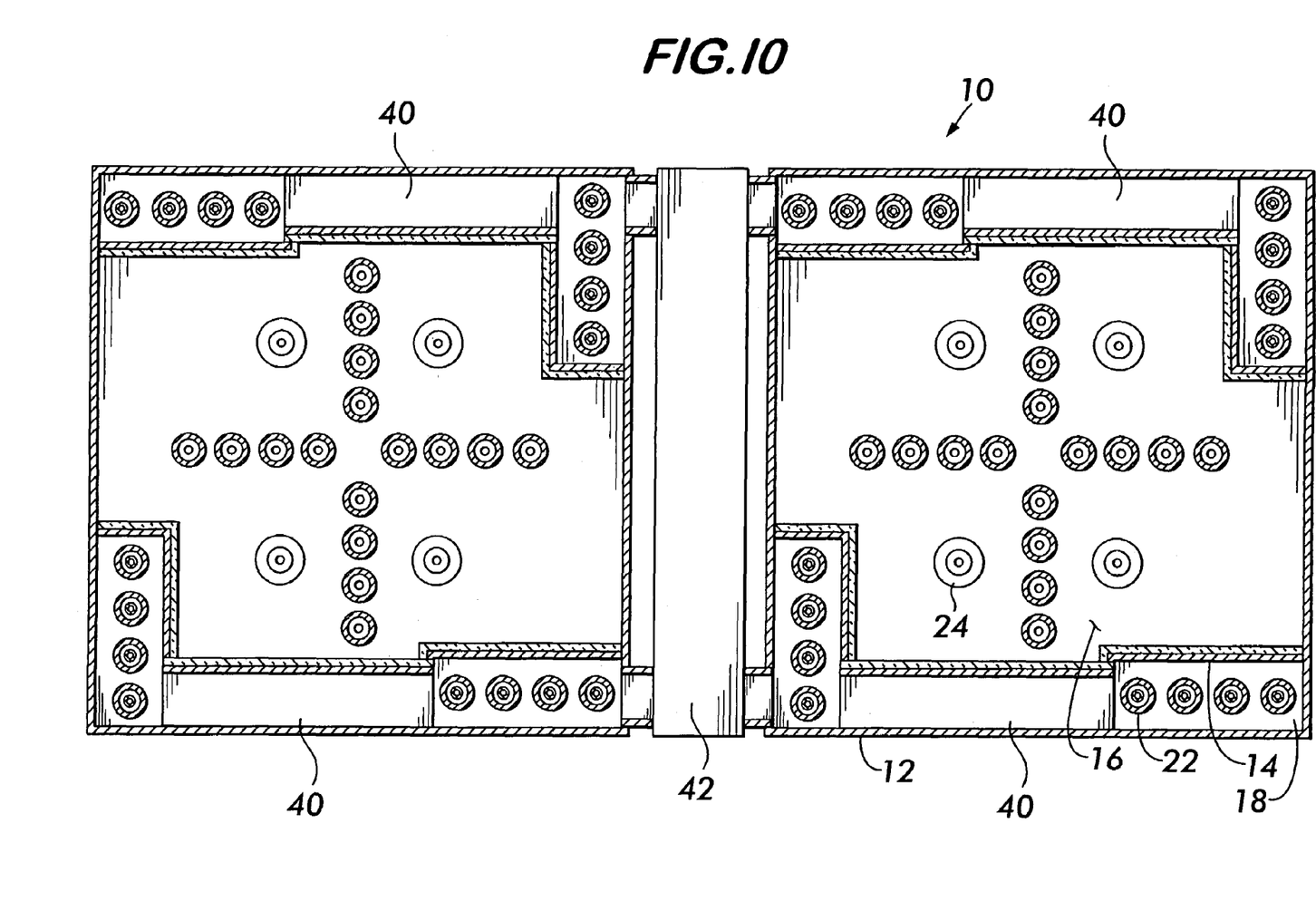
FIG. 10 is a schematic partial cross-sectional plan view of two modular units of the apparatus side-by-side with ducts connecting the convection chambers of both units to a common convection pass located between the units.

FIG. 10 shows a configuration having two modular units of the apparatus 10 side-by-side with flue gas ducts 40 connecting the convection chambers 18 of both the units to a common convection pass 42 located between the units. Additional units can be added above or below the units shown and/or laterally (e.g., to the right or to the left of the units shown).

Figure 11:
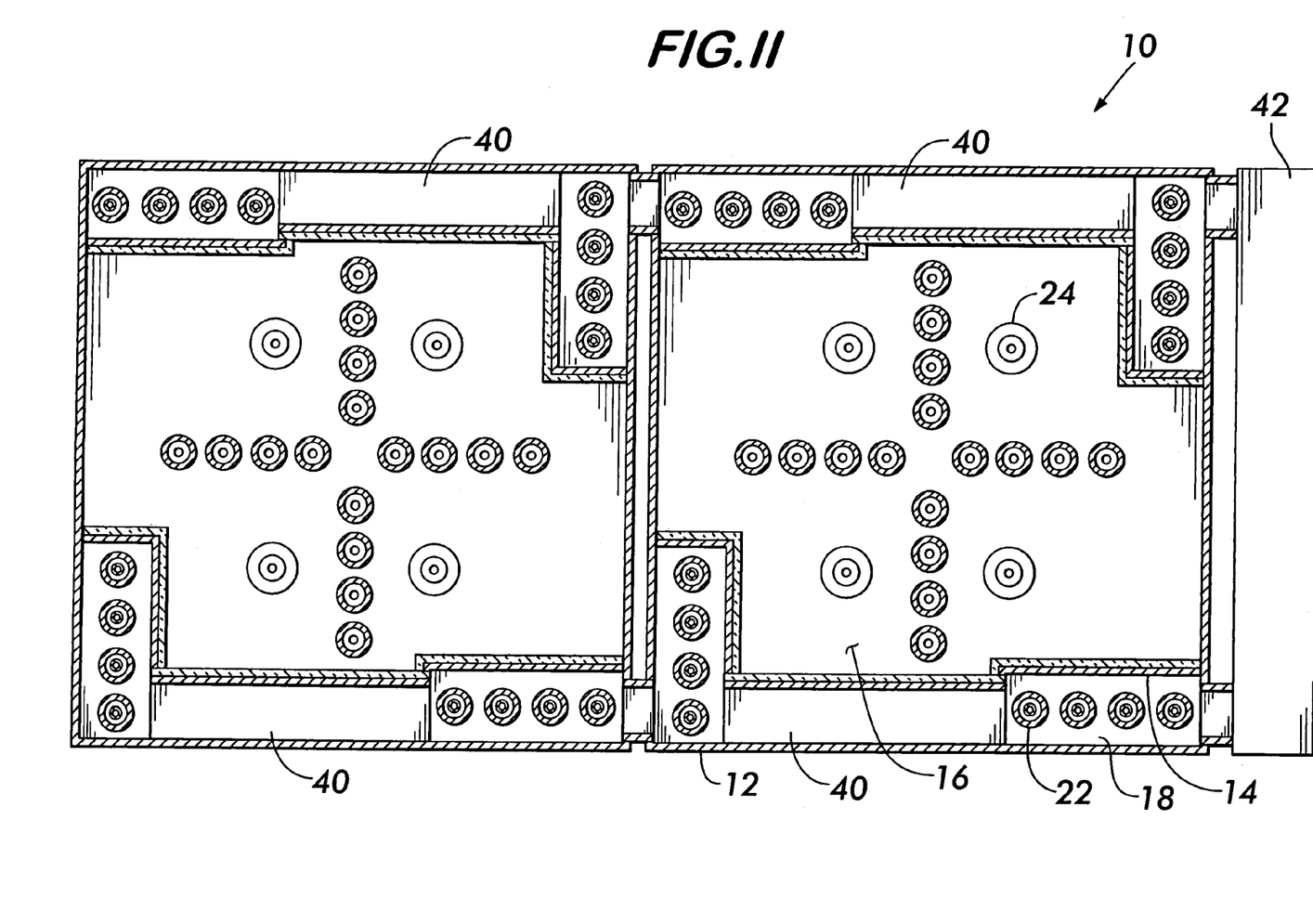
FIG. 11 is a partial cross-sectional plan view of two modular units of the apparatus side-by-side with ducts connecting the convection chambers of both units to a common convection pass located on one side of one of the units.

FIG. 11 shows another configuration having two modular units of the apparatus 10 side-by-side with flue gas ducts 40 connecting the convection chambers 18 of both units to a common convection pass 42 located on one side of one of the units. Additional units can be added above or below the units shown and/or laterally (e.g., to the right or to the left of the units shown).

Figure 12:
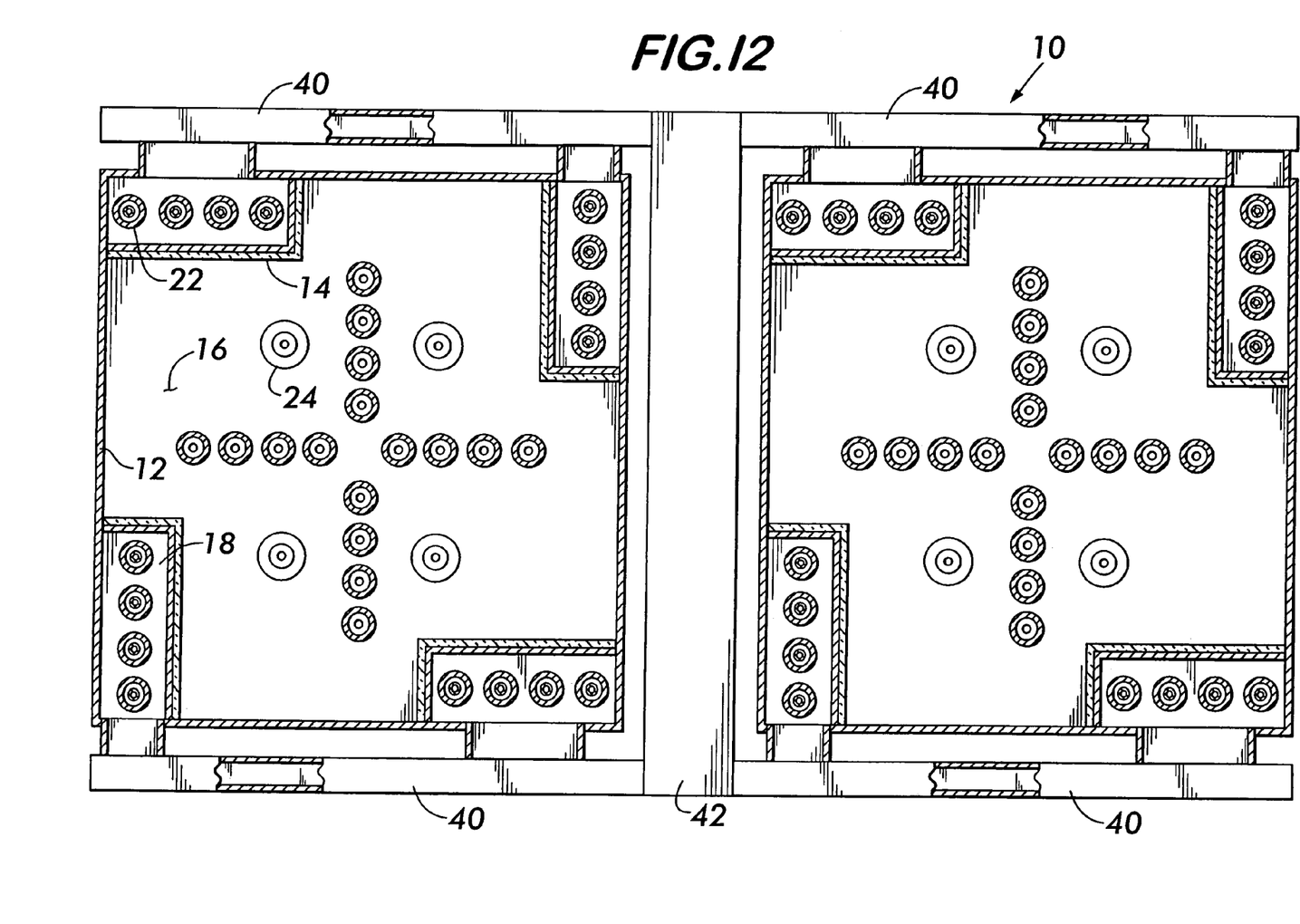
FIG. 12 is a partial cross-sectional plan view of two modular units of the apparatus side-by-side with ducts on the outside connecting the convection chambers of the units to a common convection pass located between the units.

FIG. 12 shows another configuration having two modular units of the apparatus 10 side-by-side with flue gas ducts 40 on the outside connecting all convection chambers 18 to a common convection pass 42 located between the units. Additional units can be added above or below the units shown and/or laterally (e.g., to the right or to the left of the units shown).

Figure 13:
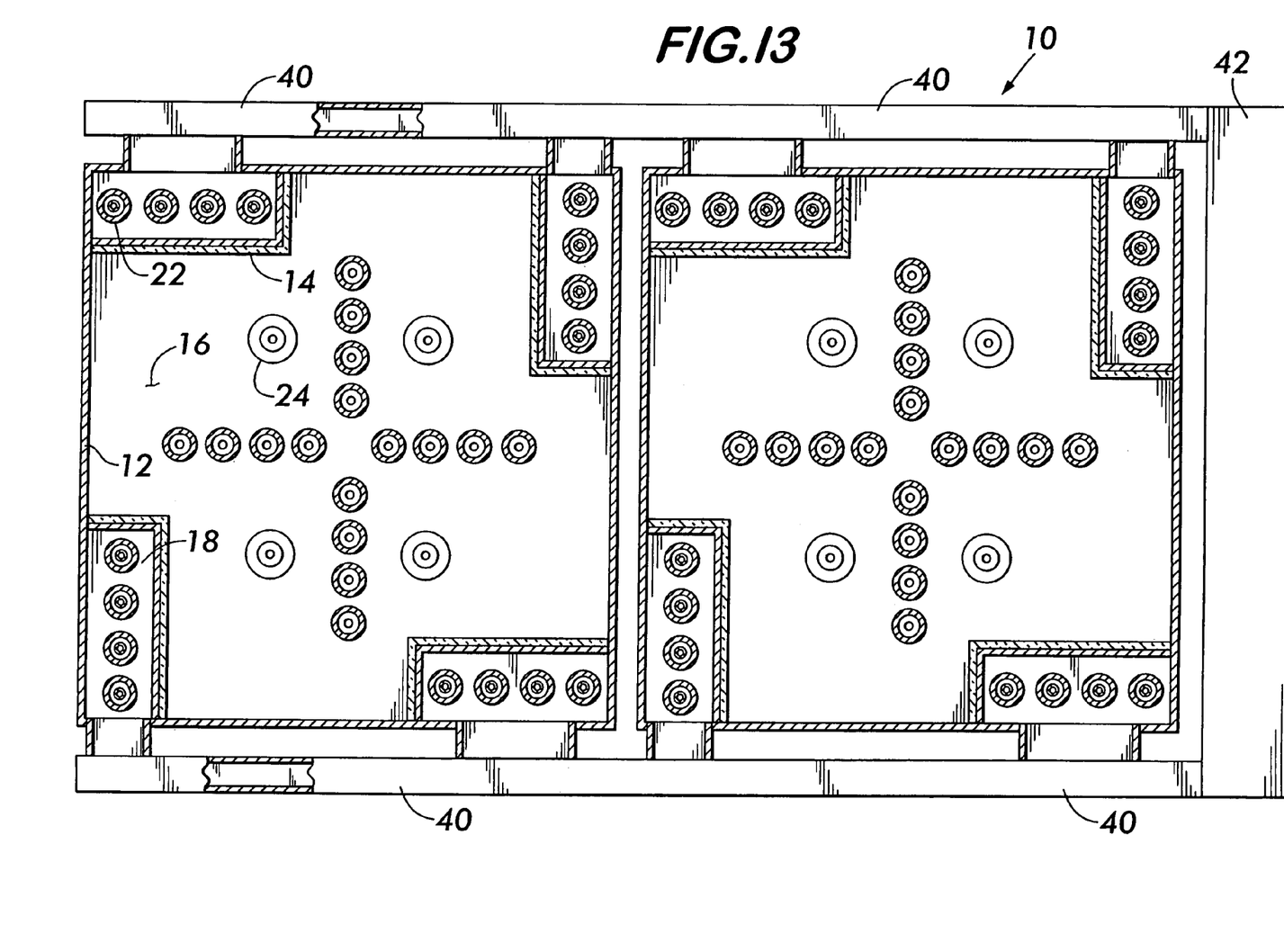
FIG. 13 is a partial cross-sectional plan view of two modular units of the apparatus side-by-side with ducts on the outside connecting the convection chambers of the units to a common convection pass located on one side of one of the units.

FIG. 13 shows another configuration having two modular units of the apparatus 10 side-by-side with flue gas ducts 40 on the outside connecting all convection chambers 18 to a common convection pass 42 located on one side of one of the units. Additional units can be added above or below the units shown and/or laterally (e.g., to the right or to the left of the units shown).

Figure 14:
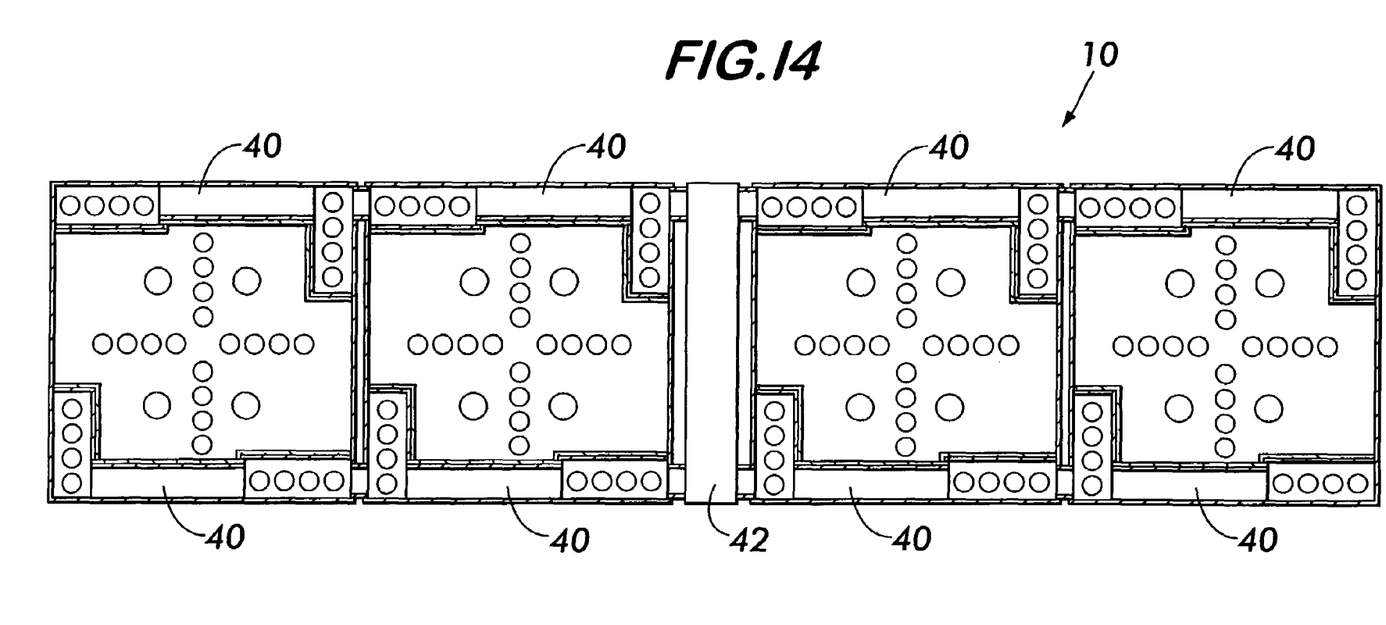
FIG. 14 is a schematic diagram of an arrangement of four modular units of the apparatus side-by-side with ducts on the inside connecting the convection chambers of the units to a common convection pass.

FIG. 14 shows a configuration having four modular units of the apparatus 10 side-by-side with flue gas ducts 40 on the inside connecting all convection chambers 18 to a common convection pass 42.

Figure 15:
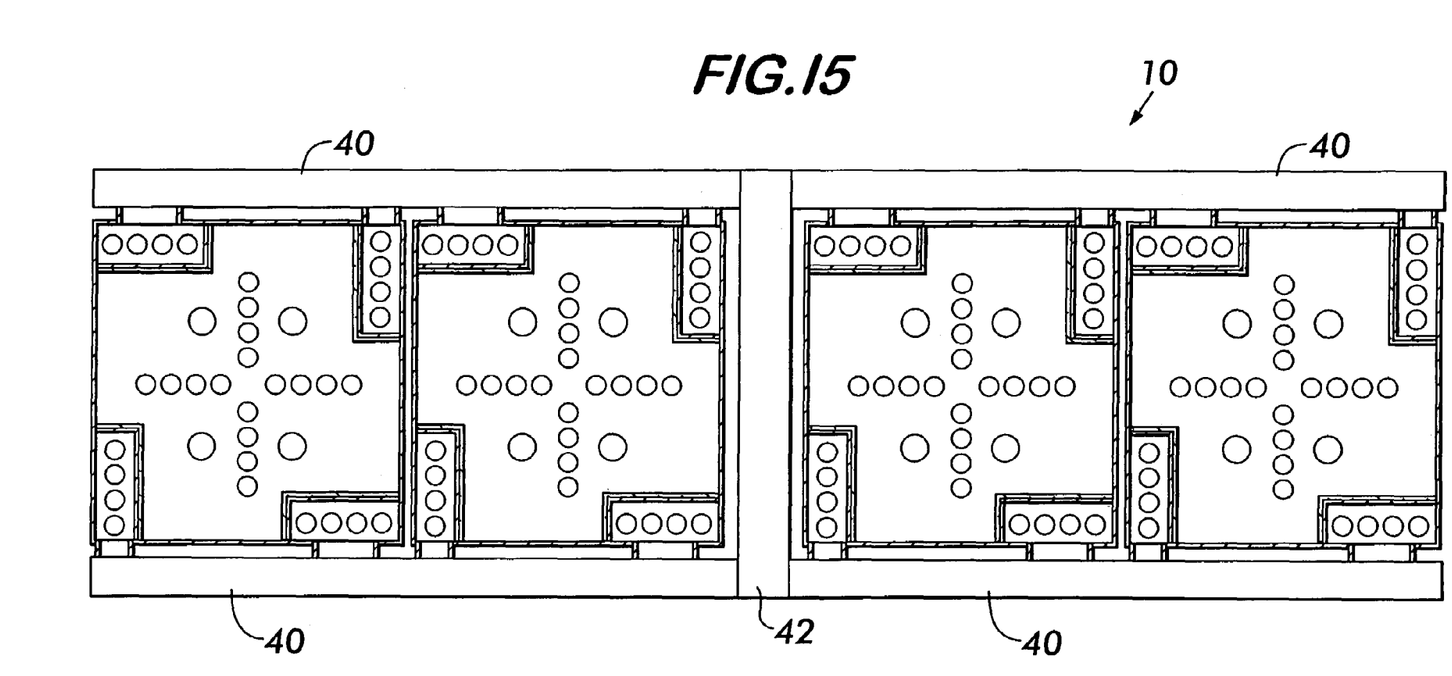
FIG. 15 is a schematic diagram of an arrangement of four modular units of the apparatus side-by-side with ducts on the outside connecting the convection chambers of the units to a common convection pass.

FIG. 15 shows another configuration having four modular units of the apparatus 10 side-by-side with flue gas ducts 40 on the outside connecting all convection chambers 18 to a common convection pass 42.

Figure 16:
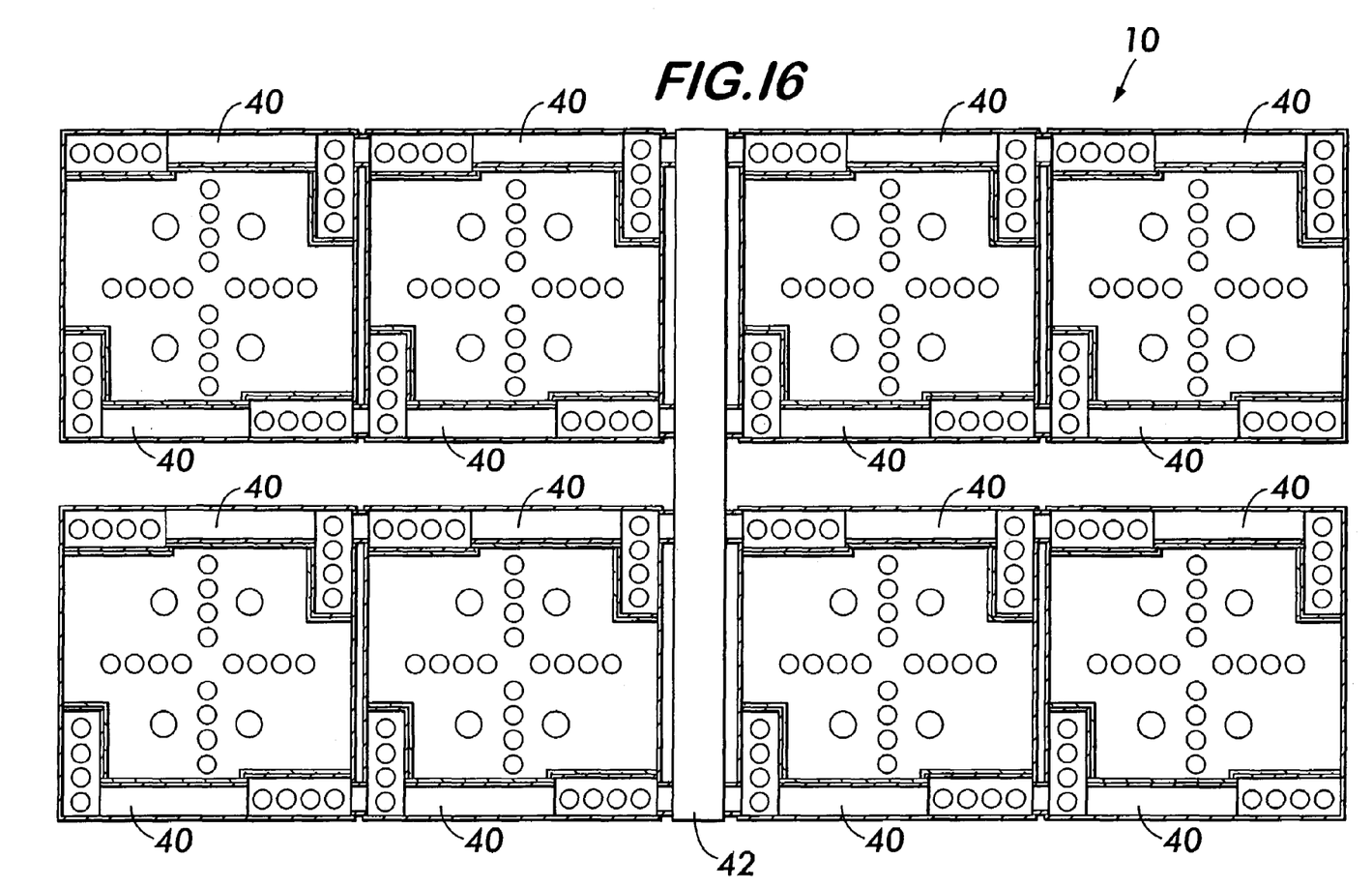
FIG. 16 is a schematic diagram of an arrangement of eight modular units of the apparatus side-by-side with ducts on the inside connecting the convection chambers of the units to a common convection pass.

FIG. 16 shows a configuration having eight modular units of the apparatus 10 side-by-side with flue gas ducts 40 on the inside connecting all convection chambers 18 to a common convection pass 42.

Figure 17:
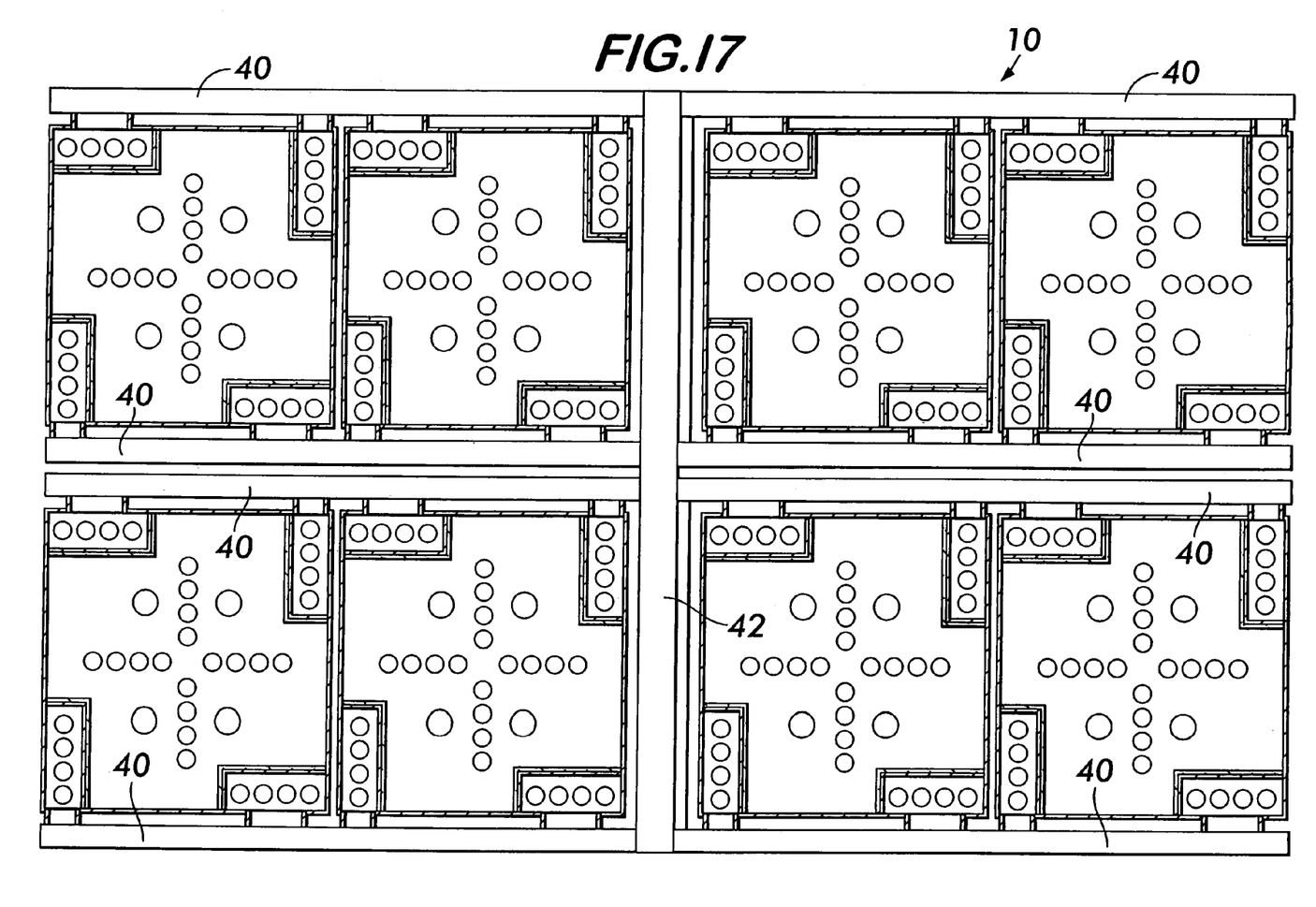
FIG. 17 is a schematic diagram of an arrangement of eight modular units of the apparatus side-by-side with ducts on the outside connecting the convection chambers of the units to a common convection pass.

FIG. 17 shows another configuration having eight modular units of the apparatus 10 side-by-side with flue gas ducts 40 on the outside connecting all convection chambers 18 to a common convection pass 42.

Figure 18:
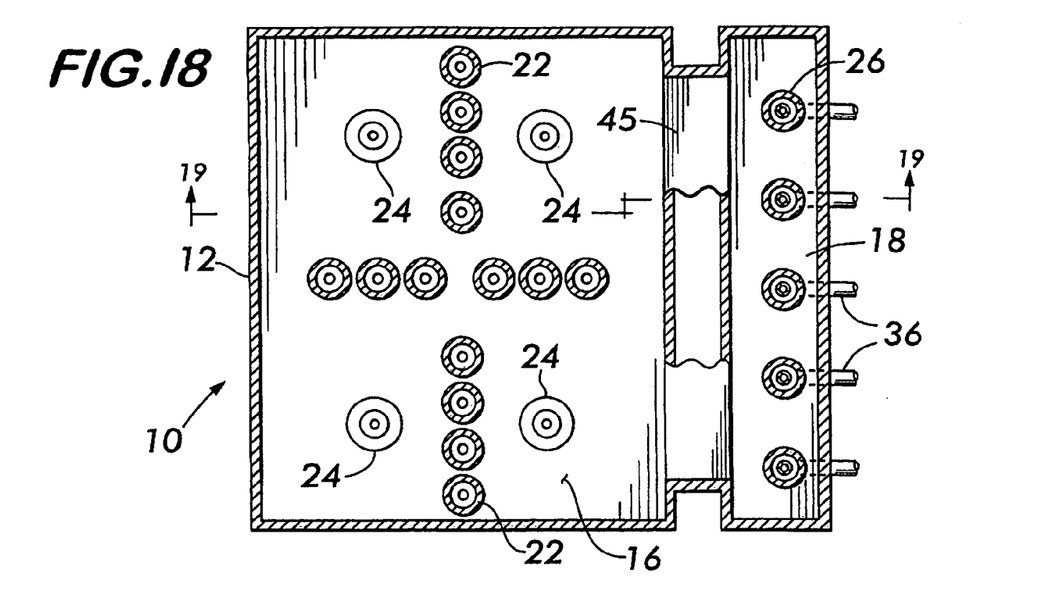
FIG. 18 is a schematic cross-sectional plan view of the apparatus for another embodiment of the invention.
Figure 19:
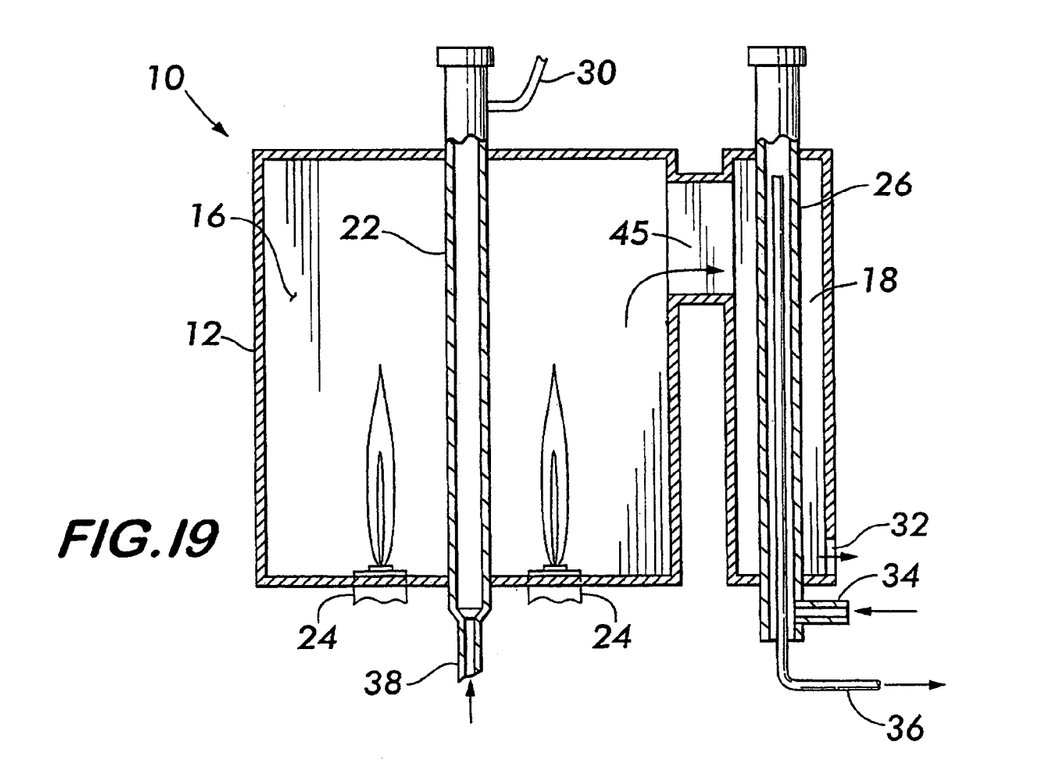
FIG. 19 is a schematic partial cross-sectional elevation of the embodiment of the invention shown in FIG. 18.

Persons skilled in the art will recognize that it is possible to have other configurations of modular units and various other arrangements of the combustion and convection chambers of the present invention. For example, FIGS. 18 and 19 show an arrangement where there is not a partition wall between the combustion chamber 16 and the convection chamber 18, the two chambers being connected by a duct 45. More than one convection chamber may be connected to the duct 45 to receive flue gas from the combustion chamber 16. Alternatively, another convection chamber(s) may be connected to the combustion chamber 16 via another duct(s) to receive flue gas from the combustion chamber. For example, referring to FIGS. 18 and 19, a second convection chamber could be connected via a second duct to the combustion chamber on the left side of the combustion chamber (i.e., directly opposite the convection chamber and duct shown), thereby "balancing" the apparatus.

The sensible heat recovery technique of the present invention allows to (1) significantly reduce the heat exchanger equipment to recover the sensible heat of both the synthesis gas and the combustion products, (2) utilize high grade waste heat from flue gas for reforming instead of generating excess steam as in conventional steam reforming processes, (3) more effectively use expensive reformer tubes to recover sensible heat for reforming reactions, (4) effectively integrate the hot product gas from the reformer tube in the combustion chamber and the tube-in-tube in the convection chambers to utilize high grade sensible heat for reforming reactions, (5) enhance convective heat transfer from the product gas by increasing temperature driving force, (6) minimize equipment and heat loss due to transfer lines compared to conventional techniques, (7) vary steam export as demanded by controlling the combustion or product gas exit temperatures, (8) combine the radiant and convection sections in one compact unit that may be built in the shop and may be used as a modular unit in a configuration where several units set side-by-side are connected with simple connections at a field site to achieve or to expand the synthesis gas production capacity, and (9) use a small convection chamber that can be designed to maximize convective heat transfer by maintaining high flue gas velocity.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. A method for producing a product from a hydrocarbon reforming process comprising:

combusting a fuel in a combustion chamber, thereby generating a combustion heat and a flue gas having a sensible heat;

transferring at least a portion of said flue gas from said combustion chamber to a convection chamber;

feeding a first portion of a mixed-feed to a first reaction chamber disposed in said combustion chamber, wherein said first portion of said mixed-feed absorbs at least a portion of said combustion heat;

feeding a second portion of said mixed-feed or another mixed-feed to a second reaction chamber disposed in said convection chamber, wherein said second portion of said mixed-feed or said another mixed-feed absorbs at least a portion of said sensible heat of said flue gas;

withdrawing the product from said first reaction chamber;

transferring the product from said first reaction chamber to said second reaction chamber; and withdrawing the product from said second reaction chamber wherein said product from said second reaction chamber flows counter-currently with said second portion of said mixed-feed or said another mixed-feed.

2. The method as in claim 1, wherein said first portion of said mixed-feed flows co-currently with the flue gas in said combustion chamber.

3. The method as in claim 1, wherein said second portion of said mixed-feed or said another mixed-feed flows counter-currently with said flue gas flowing in said convection chamber.

4. The method of claim 1 further comprising:

connecting the first reaction chamber to the second reaction chamber by a pigtail for the step of transferring the product from said first reaction chamber to the second reaction chamber.

* * * * *